UNITED STATES PATENT OFFICE.

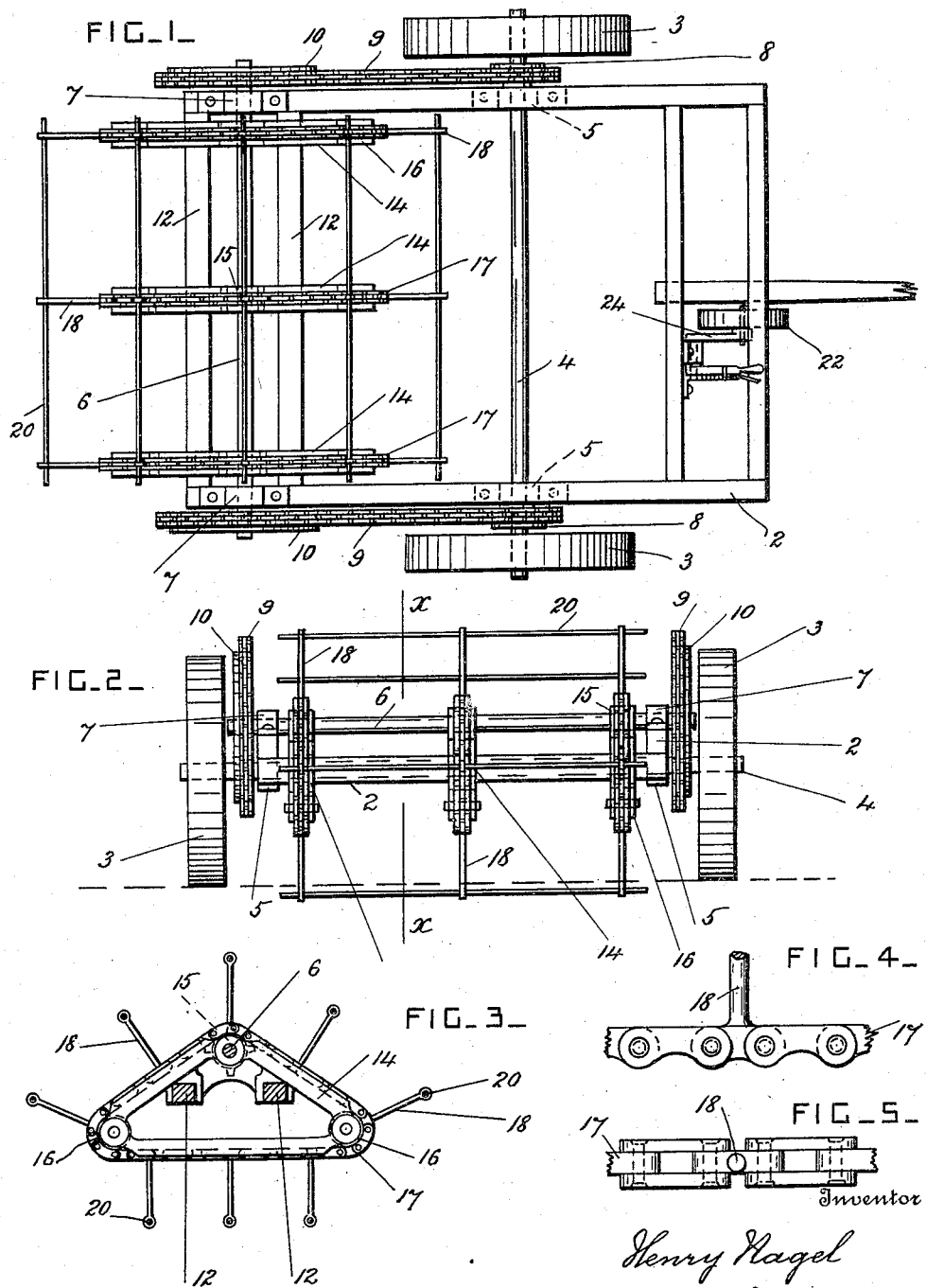

HENRY NAGEL, OF RITZVILLE, WASHINGTON.

WEED-DESTROYER.

1,173,504.  Specification of Letters Patent.  Patented Feb. 29, 1916.

Application filed May 20, 1915. Serial No. 29,320.

*To all whom it may concern:*

Be it known that I, HENRY NAGEL, a citizen of the United States, residing at Ritzville, in the county of Adams and State of Washington, have invented certain new and useful Improvements in Weed-Destroyers; and I do hereby declare the following to be a full, clear, and exact description of the invention, such as will enable others skilled in the art to which it appertains to make and use the same.

This invention relates to machines for destroying weeds growing in ground prepared for crops; and it consists in the novel construction and combination of the parts hereinafter fully described and claimed.

In the drawings, Figure 1 is a plan view of a machine constructed according to this invention. Fig. 2 is an end view of the same. Fig. 3 is a cross-section through the reel, taken on the line $x$—$x$ in Fig. 2. Fig. 4 is a detail side view, and Fig. 5 is a detail plan view, showing a preferred form and arrangement of some of the links of the conveyer chains of the reel.

This machine is specially adapted for use on large tracts of land which have been plowed and prepared, or partially prepared, for being seeded with wheat or other grain. Such land has a surface of loose earth, and in the interval of time between preparing it and sowing the seed it becomes full of weeds. These weeds exhaust the soil in a measure and should be destroyed, and it is also desirable to preserve the loose condition of the surface soil.

The machine is provided with a main frame 2 which is mounted on ground wheels 3. These wheels are arranged upon an axle 4 which is journaled in bearings 5 secured to the frame, and the axle is revolved as the machine is drawn along. The machine is drawn along by horses or a tractor, and it has a draft-attachment, a driver's seat, and other necessary parts, of any approved construction.

A reel shaft 6 is journaled in bearings 7 at the rear part of the main frame, and is revolved from the axle, and in the same direction as the axle, by driving mechanism of any approved construction.

In the machine shown, sprocket wheels 8 are secured on the axle, and large sprocket wheels 10 are secured on the reel shaft. Drive chains 9 pass over these sprocket wheels, and the reel shaft is revolved at a slower speed than the axle, but in the same direction.

The main frame 2 has two strong crossbars 12 at its rear end portion, and 14 are conveyer frames secured to the crossbars 12. Three conveyer frames are preferably used. The conveyer frames have openings at their middle parts, and the crossbars 12 are arranged in these openings, and are bolted to the side portions of the conveyer frames. Each conveyer frame has a driving wheel 15 at its upper part, which wheel is secured on the reel shaft 6.

Guide wheels 16 are journaled in the lower portion of each conveyer frame, and the wheels 15 and 16 are arranged in the form of a triangle, the two guide wheels 16 being below the driving wheel 15 and arranged substantially parallel to the ground.

Conveyer chains 17 of any approved construction are arranged to run on the wheels 15 and 16, and certain of the chain links have arms 18 secured to them so that they project radially of the wheels over which they pass.

Rods 20 are secured to the free end portions of the arms, and extend crosswise of the machine between and over the three conveyer frames. A substantially triangular reel is thereby formed, and the lower side of the reel is substantially parallel to the ground or horizontal.

The weight of the machine is principally carried by the ground wheels 3, which are arranged at the middle part of the frame.

A regulating wheel 22 is provided at the front part of the frame, and is provided with a pivoted lever 24 and suitable connections for raising and lowering it. The wheel 22 runs on the ground and determines the position of the reel and the engagement of its rods with the soil.

As the machine is drawn along, the conveyer chains of the reel are moved from front to rear on the lower side of the reel, and at a predetermined speed. The reel bars or rods 20 are drawn slowly through the loose earth at the surface of the ground, and they destroy all the weeds, and discharge them at the rear end of the machine. As the weeds, when pulled up, are discharged at the rear of the machine, the reel does not become clogged. The reel is made of considerable width so that the machine destroys a wide swath of weeds at each journey across the field, and it can clear a great many acres of weeds in the course of a day.

What I claim is:

1. In a weed destroyer, a wheeled main frame, endless conveyers arranged longitudinally of the main frame and provided with projecting arms, rods secured to and connecting the said arms and arranged crosswise of the main frame, and driving mechanism for operating the conveyers as the machine is drawn along.

2. In a weed destroyer, a wheeled frame, conveyer frames arranged longitudinally of the main frame, wheels journaled in the conveyer frames and arranged in triangular form, endless conveyers working over the said wheels, the lower stretch of each conveyer being arranged substantially horizontal, arms projecting from the said conveyers, rods secured to and connecting the said arms and arranged crosswise of the main frame, and driving mechanism for operating the conveyers as the machine is drawn along.

3. In a weed destroyer, a main frame having ground wheels at its middle part, endless conveyers arranged longitudinally of the main frame, at its rear part, and provided with projecting arms, rods secured to and connecting the said arms and arranged crosswise of the main frame, driving mechanism for operating the conveyers as the machine is drawn along, and an adjustable ground wheel at the front end of the said frame for regulating the engagement of the said rods with the ground.

4. In a weed destroyer, a wheeled main frame, endless conveyers arranged longitudinally of the main frame and provided with projecting arms, rods secured to and connecting the said arms and arranged crosswise of the main frame, and driving mechanism operating to move the lower stretches of the conveyers rearwardly as the machine is moved forwardly whereby the weeds are discharged at the rear of the machine.

5. In a weed destroyer, a wheeled main frame provided with two crossbars at its rear part, triangular conveyer frames having openings at their middle parts for the passage of the crossbars and having the crossbars secured to their inclined sides and having substantially horizontal lower sides, a reel shaft journaled in the main frame and arranged at the apices of the conveyer frames, driving wheels secured on the reel shaft, guide wheels arranged at the lower angles of the conveyer frames, drive chains passing over the said wheels and provided with projecting arms, rods secured to and connecting the said arms and arranged crosswise of the main frame, and driving mechanism for revolving the reel shaft as the machine is drawn along.

In testimony whereof I have affixed my signature.

HENRY NAGEL.

Copies of this patent may be obtained for five cents each, by addressing the "Commissioner of Patents, Washington, D. C."